Patented Apr. 10, 1945

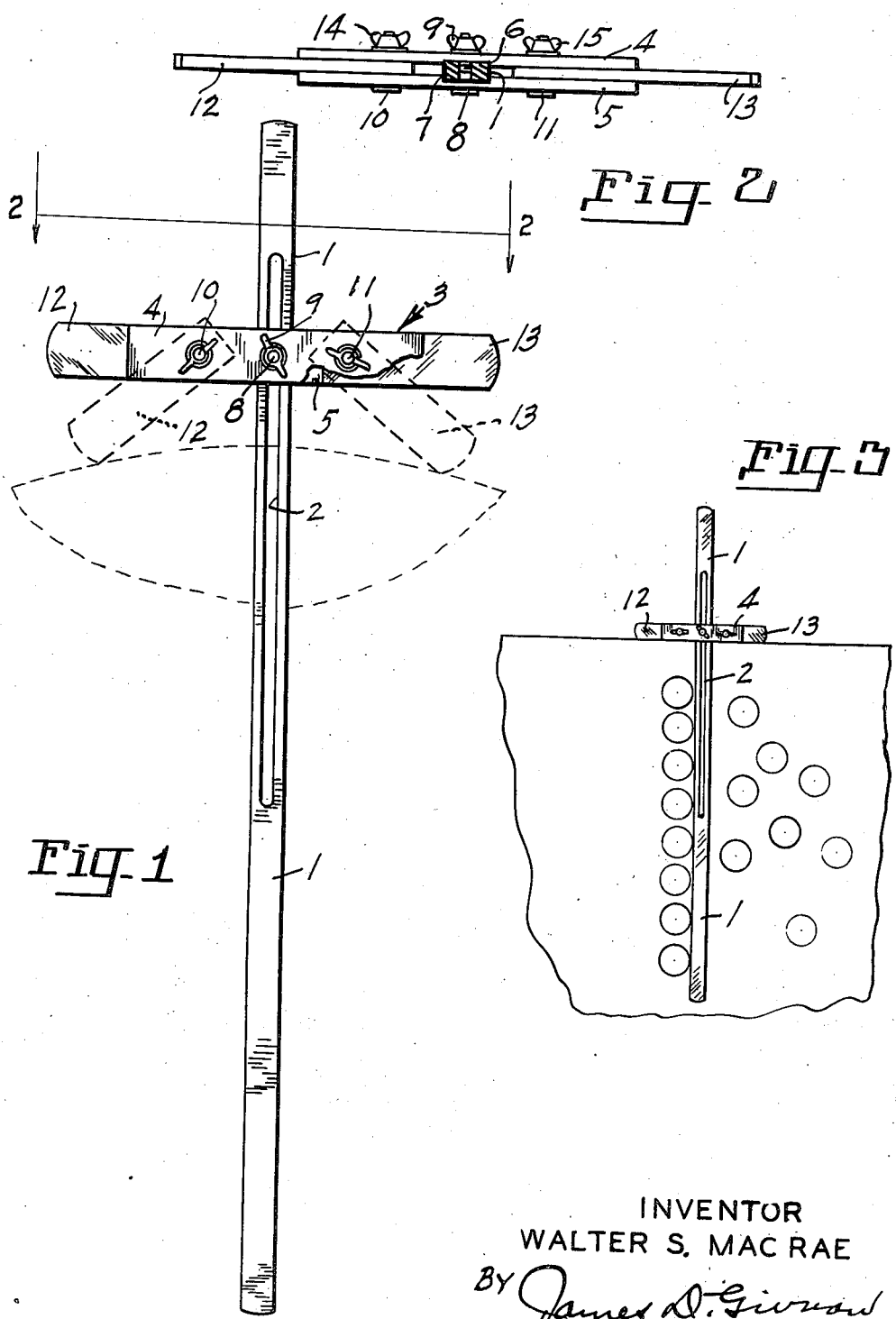

2,373,322

UNITED STATES PATENT OFFICE 2,373,322

DEVICE FOR ALIGNING GLASSES ON A BAR

Walter S. MacRae, Prescott, Ariz.

Application June 26, 1943, Serial No. 492,400

1 Claim. (Cl. 33—98)

This invention relates to improvements in a device for aligning glasses on a bar or the like and has for one of its principal objects the provision of a flat shaft or blade of suitable thickness to be moved over the surface of the bar into contact with scattered glasses and to move them into straight rows. The blade is provided with an adjustable cross-arm which may be arranged at any angle with respect to the blade for sliding contact with the straight edge of the bar. Supplemental adjustable means are also provided on the cross-arm for contacting the outer edge of a curved or circular bar so that the blade will project radially across the bar and arrange the glasses in straight lines accordingly.

The foregoing and other objects will appear as my invention is more fully hereinafter described in the following specification, illustrated in the accompanying drawing, and finally pointed out in the appended claim.

In the drawing:

Figure 1 is a top plan view of a device made in accordance with my invention.

Figure 2 is a sectional view taken on the line 2—2 of Figure 1.

Figure 3 is a reduced top plan view of the device in operative engagement with a bar and a number of glasses disposed thereupon.

Referring now more particularly to the drawing:

Reference numeral 1 indicates the main body of the device in the form of a flat blade preferably made of wood and formed with a longitudinal slot 2. A cross-arm, generally indicated at 3, is provided for slidable and lockable engagement with the blade 1. The cross-arm comprises two parallel members 4 and 5 spaced apart as shown, and slotted on their inner sides as at 6 and 7 for slidable and lockable engagement with the blade. A bolt 8 passes through both elements 4 and 5 and through the slot 2 in the blade 1. A wing-nut 9 is provided on the bolt for conveniently clamping the cross-arm in any of its adjusted positions upon the blade. Swingably attached by means of bolts 10 and 11 between each of the elements 4 and 5 is a pair of arms 12 and 13 adapted to be locked by wing nuts 14 and 15 into alignment with the elements 4 and 5 or at any angular position with respect thereto as shown in Figure 1. The arms 12 and 13 are secured in aligned positions as aforesaid for engagement with the outer edge of a straight bar as shown in Figure 3 and may be swung and locked into the positions shown in dotted lines in Figure 1 for engagement with the curved edge of a round or horseshoe shaped bar as shown in dotted lines. In either case, the blade extends across the bar and either of its straight edges engages with the glasses disposed upon a bar and arranges them in alignment with each other in rows at right angles to the bar as shown in Figure 3.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A device of the character described comprising a flat elongated blade having a slot formed therein in the direction of its length, a cross-arm consisting of two members of identical shape pivotally and slidably attached as a unit to said blade on opposite sides thereof by means of a bolt extending through said members and said slot and provided at one of its ends with a wing-nut for locking said cross-arm in any of its adjusted positions with respect to said blade, extension arms pivotally attached at fixed pivot points at their inner ends between said cross-arm members, said extension arms being of equal width to that of the cross-arm, and said extension arms being adapted to be moved around their pivot points away from right angles to the blade and into contact with the surface of a curved bar for projecting the blade radially from said curved bar surface across the bar into contact with scattered glasses thereon and to arrange the same in radial lines extending inwardly from the outer edge of said bar.

WALTER S. MACRAE.